(No Model.) 2 Sheets—Sheet 1.
J. H. GARTRELL.
APPARATUS FOR INDICATING AND REGULATING FLUID PRESSURE.
No. 517,451. Patented Apr. 3, 1894.

Witnesses.
William Badgery
Walter Hallo

Inventor:
John Hutchin Gartrell
per John Pitt Bayly,
Attorney (No Model.) 2 Sheets—Sheet 2.

J. H. GARTRELL.
APPARATUS FOR INDICATING AND REGULATING FLUID PRESSURE.

No. 517,451. Patented Apr. 3, 1894.

Witnesses.
William Badgery
Walter Hallo

Inventor.
John Hutchens Gartrell
per John Pitt Bayly
Attorney

UNITED STATES PATENT OFFICE.

JOHN HUTCHENS GARTRELL, OF PENZANCE, ENGLAND.

APPARATUS FOR INDICATING AND REGULATING FLUID-PRESSURE.

SPECIFICATION forming part of Letters Patent No. 517,451, dated April 3, 1894.

Application filed December 26, 1893. Serial No. 494,703. (No model.) Patented in England May 26, 1892, No. 9,985.

*To all whom it may concern:*

Be it known that I, JOHN HUTCHENS GARTRELL, surgeon-dentist, a subject of the Queen of Great Britain, residing at 47 Chapel Street, Penzance, in the county of Cornwall, England, have invented a new and useful Improvement in Appliances for Indicating and Regulating Fluid-Pressure, (for which I have obtained a patent in Great Britain, No. 9,985, bearing date May 26, 1892,) of which the following is a specification.

The present invention relates to combined pressure gages and pressure regulators, chiefly applicable for automatically regulating the flow or supply of gas to the burner or burners of boilers or vulcanizers used in the manufacture of dental plates, while indicating the pressure of steam within such boilers.

The object of the present improvement is to simplify the manufacture or construction and thereby to reduce the cost of such apparatus.

This combined pressure gage and regulator chiefly comprises a pointer or hand controlled by a Bourdon tube or a Schäffer diaphragm, so as to indicate on a graduated scale the steam pressure acting on the said tube or diaphragm; a valve controlled by the devices that move the said index hand, and another pointer connected with the valve seat or opening, so that by adjusting the latter the pointer will be caused to indicate on a graduated scale the pressure at which the valve will close.

In further describing the invention, reference will be made to the accompanying drawings, of which—

Figure 1:
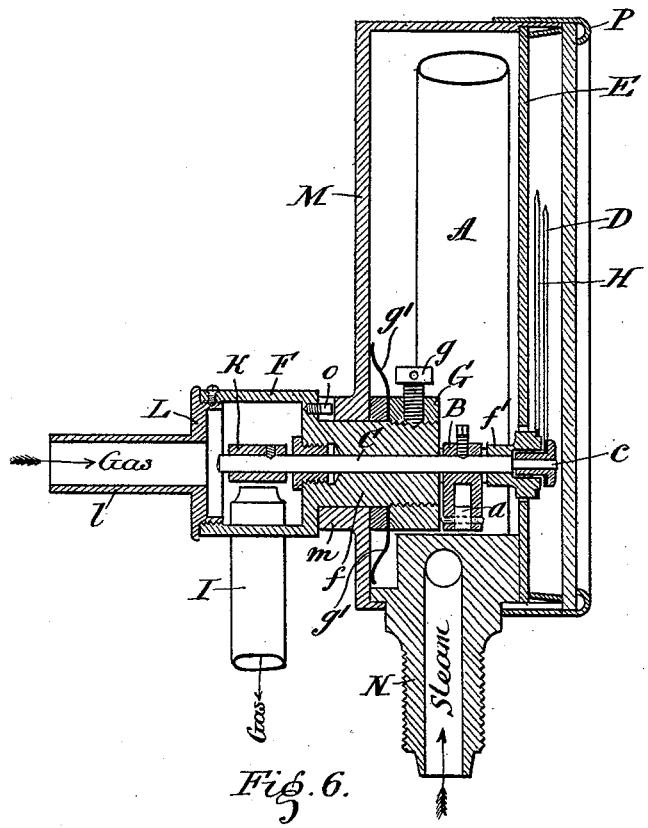
Figure 6:
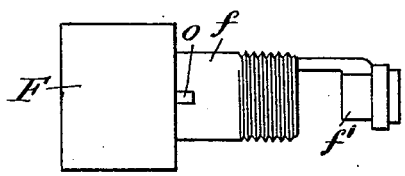
Figure 2:
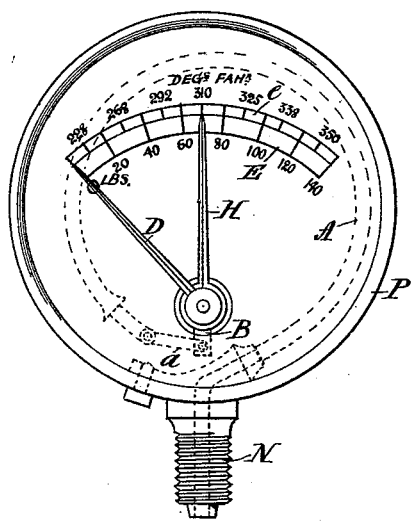
Figure 4:
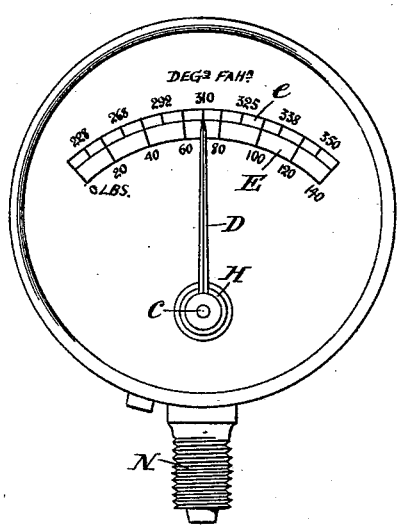
Figure 3:
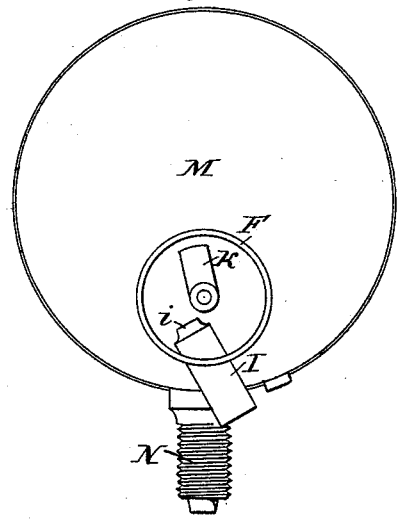
Figure 5:
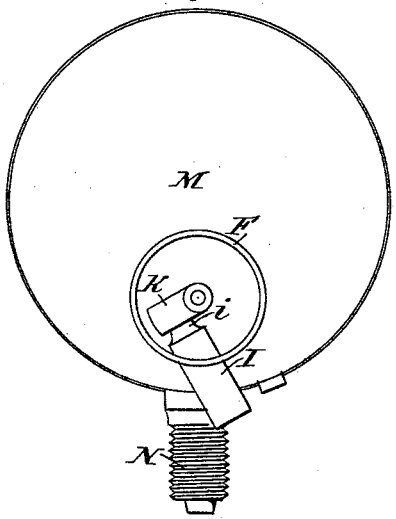

Figure 1, is a vertical section of an apparatus embodying my invention. Fig. 2, is a front view; Fig. 3, a back view when the gas supply pipe is open. Fig. 4, is a front view and Fig. 5, a back view of the same, when the gas inlet is closed. In Figs. 3, and 5, the cover of the valve chamber is supposed to have been removed. Fig. 6, is a plan of the valve casing and of the parts connected or made in one piece with the same.

The general construction and appearance of the pressure gage are similar to that of an ordinary Bourdon or Schäffer gage.

In the drawings A represents a Bourdon tube, connected by a link $a$ with a short lever B which is fixed on the axle C carrying the index hand D. The latter shows on a pair of graduated scales E and $e$ the steam pressures and the temperatures corresponding to various positions of the Bourdon tube.

M represents the back or casing of the pressure gage, P the ring or rim which holds the glass cover, and N the pipe through which the steam enters the tube A.

The regulating valve K is situated in a small gas chamber fixed to the back of the pressure gage, and the central spindle C carrying the index hands extends through the back of the gage into the valve chamber, where it carries the regulating valve. The valve chamber has a gas inlet $l$ and an outlet I, the inlet being preferably placed at the back of the valve chamber, while the outlet pipe passes through the circumference of the chamber, and is arranged in such a manner, that its mouth $i$ can be closed by the regulating valve K, when the pressure has reached a given limit. In the instruments hitherto made, the central spindle C has its bearing in the rear wall of the pressure gage, M, the said rear wall being provided externally with a boss which fits into the open base of the cylindrical valve casing. Now, as this construction rendered it difficult, to make the spindle C exactly concentric with the boss which guides the valve casing when being turned on its center, special precautions were necessary, to insure, that the valve fits exactly on the orifice $i$ of the outlet pipe I, at whatever angle the valve-casing may be placed. For this purpose, the face of the valve was connected with the body of the same by a pivot, and in taking the instrument to pieces, the valve casing and the spindle C had to be detached from the back of the pressure gage separately, one after the other. To avoid these drawbacks, I make the bottom of the valve chamber in one piece with the side of the valve casing F, and provide it with a long boss or sleeve $f$ extending through the back plate or wall M of the pressure gage into the interior of the same, as shown. Thus, the valve casing F, instead of being open at the bottom and provided with an outside flange, has a flangeless bottom provided with an external hub or sleeve which is bored out axially to receive and support the central spindle C, which is provided with a small stuffing box, to prevent the escape of gas from the valve chamber into the interior of the pressure gage. The back plate or wall M of the latter has a boss $m$, which is bored out to suit the external diameter of the said sleeve.

In order to hold the valve box F firmly against the pressure gage, so as to prevent any accidental motion around its axis, a spring $g'$ is placed on the sleeve $f$ and a ring or collar G is screwed to the inner extremity of the sleeve, immediately behind the boss or bearing of the back plate M and is secured in position by a set screw $g$. The motion of the valve box around its axis is limited by another screw, or stud O, which passes through a segmental recess of the bearing and is fixed in the bottom of the box F. The two pointers or index fingers mentioned above turn on the same axis, one, D, being fixed to the extremity $c$ of the central spindle C, while the other H is mounted on the front end $f'$ of a curved arm (shown in Fig. 6) which extends from the inner end of the sleeve $f$ and is bored out to form a bearing for the front end of the spindle C. The said arm is so arranged as to allow sufficient space for the motion of the lever B and link $a$ which connects the spindle with the Bourdon tube, &c. The index finger H indicates the position of the valve K with regard to the outlet $i$. The collar or nut G is screwed on so tight, that the friction between itself and the bearing and also between the bottom of the valve casing and the back of the casing M will prevent accidental displacement of the valve casing, after the latter together with the valve seat has been turned into the desired position. If desired, the valve casing may be secured after every adjustment by means of a set screw passing through a slotted flange formed on the circumference of the valve casing, or by other convenient means.

For taking the improved instrument to pieces, it is only necessary, to remove the two pointers or index fingers, D and H, loosen the set screw which secures the lever B connecting the spindle C with the link $a$ and Bourdon tube A, and screw the collar G off the sleeve $f$, after which the valve casing, together with the central spindle and valve, may be drawn out from the back.

What I claim, and desire to secure by Letters Patent of the United States, is—

1. In a combined pressure gage and regulator, of the type specified, a valve casing closed at the bottom and provided with a cylindrical sleeve or boss supported and guided in a cylindrical bearing formed in the back of the pressure gage, said boss having an axial bore for the spindle which actuates the index hand of the pressure gage and the valve, and an arm or extension adapted to carry the index hand which indicates the position of the valve seat, substantially as described.

2. In a combined pressure gage and regulator, the combination of a spindle C carrying at one end the index hand D of the pressure gage and at the other end the regulating valve K, with a Bourdon tube or equivalent device connected with the said spindle and adapted to control the same, a valve casing F containing the valve seat and provided with a boss $f$ adapted to support and guide the valve spindle C at the back and carrying an index hand H in front, a pressure gage casing having in front a graduated scale for the two index hands and at the back a bearing for the boss of the valve casing, and means for retaining the valve casing axially in position and for limiting its angular or pivotal motion, substantially as described.

JOHN HUTCHENS GARTRELL.

Witnesses:
  WILLIAM BADGORY,
  WALTER HALLE.